Patented Dec. 5, 1944

2,364,227

UNITED STATES PATENT OFFICE 2,364,227

PRODUCTION OF POLYMERIC VINYL MATERIALS WITH AN IMPROVED RESISTANCE TO WATER

John Richard Lewis, Leslie Budworth Morgan, and John Thomas Watts, Manchester, England, assignors to Imperial Chemical Industries Limited, a corporation of Great Britain No Drawing. Application November 5, 1941, Serial No. 417,880. In Great Britain December 6, 1940

8 Claims. (Cl. 260—88)

This invention relates to the production of improved polymeric materials, more particularly to the production of polymeric vinyl chlorides having an improved resistance to absorption of water.

It has already been proposed to polymerise vinyl chloride in the form of aqueous emulsions, in the presence of dispersing or emulsifying agents, in the presence or absence of actinic light and/or polymerisation accelerators, and according to known proposals the polymeric material is separated from the aqueous media by adding a coagulant, or by freezing out or by cataphoresis. When working according to procedure outlined above, prolonged washing is required to remove the major proportion of the dispersing or emulsifying agent from the polymeric material. If the major proportion of the dispersing or emulsifying agent is not removed, the polymeric material is too highly water-absorbent for some purposes, for example, when used for the production of electric insulators.

It is an object of this invention to provide a process whereby polymeric substances prepared by the polymerisation of vinyl chloride in aqueous emulsion in the presence of emulsifying or dispersing agents shall be readily isolated from said aqueous medium. Another object is to provide such polymeric substances having improved (i. e. lower) water-absorption and a further object is to provide such polymeric materials having improved electrical properties. Other objects will be apparent from the description.

According to the present invention, therefore, the foregoing objects are accomplished by polymerising vinyl chloride in the form of an aqueous emulsion in the presence of dispersing or emulsifying agents, comprising salts of true sulphonic acids or of sulphuric acid esters of organic compounds containing at least 8 carbon atoms and thereafter isolating the polymeric material from the aqueous dispersion by the addition of a water-soluble lead salt thereto.

As dispersing or emulsifying agents there may be used, for example, the sodium salt of sulphonated oleic acid, Turkey red oil, the sodium salt of sulphated cetyl alcohol, the sodium salt of alpha-hydroxy octadecane sulphonic acid and the other compounds of this type mentioned specifically in British specification numbered 410,132.

As water-soluble lead salts there may be used, for example, lead chlorate, lead nitrate, or lead acetate.

In carrying the invention into effect we polymerise vinyl chloride in an aqueous emulsion in the presence of a proportion of a dispersing or emulsifying agent as hereinbefore defined, for example, a proportion varying between 1–25% based on the weight of the vinyl chloride, and preferably at a pH of from 6.8–7.2. The polymerisation may be effected at elevated temperatures and/or pressures and in the presence or absence of a polymerisation accelerator and/or of actinic light, and if desired, in the presence of a plasticiser. The aqueous dispersion of the polymeric material is heated to and maintained at a temperature of, for example, 80–90° C., the pH is adjusted to about 8.0–9.0 by the addition of a base such as caustic soda, and the water-soluble lead salt is gradually added, preferably in the form of an aqueous solution, for example a 5% aqueous solution of lead acetate, whilst maintaining the pH of the mixture at about 8.0–9.0 by gradually adding more base as required. The polymeric material separates from the aqueous mixture as a granular, white powder; it is recovered by filtering, washing for a short time with water, and drying, for example, at a temperature of 50° C.

Throughout the description and claims of this specification the terms "polymerising" and "polymerisation" are intended to include "interpolymerising" and "interpolymerisation" respectively.

The polymeric materials may be incorporated with plasticisers according to any known procedure. The plasticised materials have very low water absorption values, as may be shown by immersing them in or otherwise placing them in contact with water, whereupon they are swollen only to a very small extent.

The improved polymeric materials, more especially after incorporation with a plasticiser, are useful in the production of shaped articles.

The following examples in which the parts are expressed by weight, illustrate but do not limit the invention.

*Example I*

475 parts of water, 7.2 parts of a 50% aqueous solution of the sodium salt of sulphonated oleic acid, 55 parts of hydrogen peroxide (20 vols.), 150 parts of vinyl chloride, and 60 parts of an aqueous solution containing 0.445 part of citric acid and 3.52 parts of di-sodium hydrogen phosphate are enclosed in an autoclave which is heated to and maintained at 40° C. and which is agitated by end over end rotation for 3 days. The pH of the dispersion so obtained is adjusted to about 8.0 by adding an aqueous solution of caustic soda, the mixture is heated to and maintained at a temperature of 80°–90° C., and there is then added slowly and with agitation 300 parts of a 5% aqueous solution of lead acetate. Throughout the addition of the solution of the lead salt, the pH is maintained at about 8.0 by the addition of further small quantities of aqueous caustic soda solution. In this way the polymer is coagulated; it separates as a white powder which is removed by filtration, washed with water and dried at 50° C. for 18 hours. The white powder so obtained contains 9.3% of lead.

50 parts of tricresyl phosphate and 100 parts of the powder obtained according to this example are milled on a rubber roller mill. There is thus obtained a pale fawn coloured sheet of material which is swollen only to the extent of 2% after immersion in water at 70° C. for 16 hours.

*Example II*

The process of Example I is repeated except that 19.3 parts of Turkey red oil are used instead of 7.2 parts of the 50% aqueous solution of the sodium salt of sulphonated oleic acid.

By plasticising and milling the polymer as described in Example I, using 40 parts of tricresyl phosphate instead of 50 parts, there is obtained a similar polymeric material which swells only to the extent of 1% when immersed in water at 70° C. for 16 hours.

*Example III*

485 parts water, 3.6 parts of the sodium salt of alpha-hydroxy octadecane sulphonic acid, 55 parts of hydrogen peroxide (20 vols.), 60 parts of an aqueous solution containing 0.445 part of citric acid, 3.52 parts of disodium hydrogen phosphate, and 150 parts of vinyl chloride are polymerised and coagulated as described in Example I.

After plasticising and milling as in Example I there is obtained a product which is swollen only to the extent of 2% after immersion in water at 70° C. for 16 hours.

A polymer is also isolated from an aqueous dispersion of same prepared according to the above example, by coagulating with sodium chloride instead of with lead acetate, thoroughly washing with water and drying. In this way, there is obtained a white powder, which on plasticising and milling as described in Example I gives a material which swells to the extent of 8% when immersed in water at 70° C. for 16 hours, instead of only 2% as is the case with the product prepared by the process of this invention.

*Example IV*

An aqueous dispersion of polyvinyl chloride is made by polymerising 100 parts of vinyl chloride, 20 parts of hydrogen peroxide (20 vols.), 20 parts of the sodium salt of sulphated cetyl alcohol, 11.2 parts of dibutyl phthalate and 180 parts of water at a temperature of 40° C. By coagulating this dispersion with 1200 parts of a 5% aqueous solution of lead acetate, whilst maintaining the pH at about 8.0 by gradually adding 23 parts of 8% aqueous caustic soda solution, according to the procedure described in Example I, there is obtained a polymeric material (115 parts) which, after milling with 30 parts of tricresyl phosphate, gives a product with a water-absorption value of 1.5%.

Isolation of the polymeric material from the aqueous dispersion by coagulation with sodium chloride instead of with the lead salt gives products which, after milling with a plasticiser, have water-absorption values varying between 17% and 40%. A product with the lower of these water-absorption values is obtained only after very prolonged washing of the sodium chloride coagulated material.

In any of the foregoing examples, a proportion of the vinyl chloride may, if desired, be replaced by another polymerisable material, in which case an interpolymer of vinyl chloride will be formed.

As many apparently widely different embodiments of this invention may be made without departing from the spirit and scope thereof, it is to be understood that we do not limit ourselves to the specific embodiments thereof except as defined in the appended claims.

We claim:

1. A process which comprises polymerising vinyl chloride in the form of an aqueous emulsion in the presence of a dispersing agent having solubility in water selected from the group consisting of salts of pure sulphonic acids of organic compounds containing at least 8 carbon atoms and salts of sulphuric acid esters of organic compounds containing at least 8 carbon atoms and thereafter isolating the polymeric material from the aqueous dispersion by adding a water-soluble lead salt thereto.

2. A process as set forth in claim 1 in which the water-soluble lead salt is lead acetate.

3. A process as set forth in claim 1 in which the lead salt is added gradually in the form of a 5% aqueous solution whilst maintaining the pH of the mixture at 8.0–9.0.

4. A polymeric material obtained by the process which comprises polymerising vinyl chloride in the form of an aqueous emulsion in the presence of a dispersing agent having water solubility selected from the group consisting of salts of true sulfonic acids of organic compounds containing at least eight carbon atoms and salts of sulphuric acid esters of organic compounds containing at least 8 carbon atoms and thereafter isolating the polymeric material from the aqueous dispersion by adding a water-soluble lead salt thereto, said material having a low water absorption value.

5. A polymeric material obtained by the process which comprises polymerising vinyl chloride in the form of an aqueous emulsion in the presence of a dispersing agent having water solubility selected from the group consisting of salts of true sulfonic acids of organic compounds containing at least eight carbon atoms and salts of sulfuric acid esters of organic compounds containing at least 8 carbon atoms and thereafter isolating the polymeric material from the aqueous dispersion by adding thereto a dilute solution of lead acetate at a pH of 8.0 to 9.0, said material having a water absorption value not greater than about 2% when immersed in water at 70° C. for 16 hours.

6. A process which comprises polymerizing vinyl chloride in the form of an aqueous emulsion in the presence of a salt of a true sulphonic acid of an organic compound containing at least 8 carbon atoms which has water solubility and thereafter isolating the polymeric material from the aqueous dispersion by gradually adding a 5% aqueous solution of lead acetate, whilst maintaining the pH of the solution at 8.0–9.0.

7. A process which comprises polymerizing vinyl chloride in the form of an aqueous emulsion in the presence of a salt of a sulphonated aliphatic carboxylic acid containing at least 8 carbon atoms which has water solubility and thereafter isolating the polymeric material from the aqueous dispersion by gradually adding a 5% aqueous solution of lead acetate, whilst maintaining the pH of the solution at 8.0–9.0.

8. A process which comprises polymerizing vinyl chloride in the form of an aqueous emulsion in the presence of the sodium salt of sulphonated oleic acid and thereafter isolating the polymeric material from the aqueous dispersion by gradually adding a 5% aqueous solution of lead acetate, whilst maintaining the pH of the solution at 8.0–9.0.

JOHN RICHARD LEWIS.
LESLIE BUDWORTH MORGAN.
JOHN THOMAS WATTS.